(12) United States Patent
Studer et al.

(10) Patent No.: US 6,388,195 B1
(45) Date of Patent: May 14, 2002

(54) INSULATED ELECTRICAL WIRE WHICH WITHSTANDS TOTAL IMMERSION

(75) Inventors: Virginie Studer, Chassieu; Laurent Preux, Chozeau; Jérôme Fournier, Lyons; Léonard Danel, Neuflieux, all of (FR)

(73) Assignee: Nexans, Paris (FR)

( * ) Notice: Subject to any disclaimer, the term of this patent is extended or adjusted under 35 U.S.C. 154(b) by 0 days.

(21) Appl. No.: 09/546,675

(22) Filed: Apr. 11, 2000

(30) Foreign Application Priority Data

Apr. 15, 1999 (FR) .............................. 99 04714

(51) Int. Cl.[7] .................................. H01B 7/00
(52) U.S. Cl. ................................... 174/120 R
(58) Field of Search ................. 174/120 R, 120 SR, 174/121 SR, 110 N; 428/383, 384, 379

(56) References Cited

U.S. PATENT DOCUMENTS 4,000,362 A * 12/1976 Kawaguchi et al. .. 174/120 SR
5,861,578 A * 1/1999 Hake et al. ............. 174/120 R

FOREIGN PATENT DOCUMENTS

| DE | 36 06 683 A1 | 9/1987 |
|----|--------------|--------|
| EP | 0 222 683 A1 | 5/1987 |
| EP | 0 712 139 A2 | 5/1996 |
| GB | 1 177 471 A | 1/1970 |
| WO | WO 88/09041 | 11/1988 |

OTHER PUBLICATIONS

Database WPI Section Ch, Week 1999234 Derwent Publications Ltd., London, GB; Class A18, AN 1992–279887 XP002125087 & JP 04 190510 A (Furukawa Electric Co Ltd), Jul. 8, 1992.

Database WPI Section Ch, Week 198031, Derwent Publications Ltd., London, GB; Class a18, AN 1980–54493C XP002125088 &JP 55 081416 A (Hitachi Cable Ltd), Jun. 19, 1980.

* cited by examiner

Primary Examiner—Chau N. Nguyen
(74) Attorney, Agent, or Firm—Sughrue Mion, PLLC

(57) ABSTRACT

An insulated wire capable of withstanding immersion in water and oil. The wire includes an electrical conductor and a coating on the conductor. The coating includes an inner layer formed of at least one layer of enamel which is disposed on the conductor and an outer layer of polyphenylene oxide or of polyphenylene oxide modified by polystyrene on top of the inner layer.

8 Claims, 1 Drawing Sheet

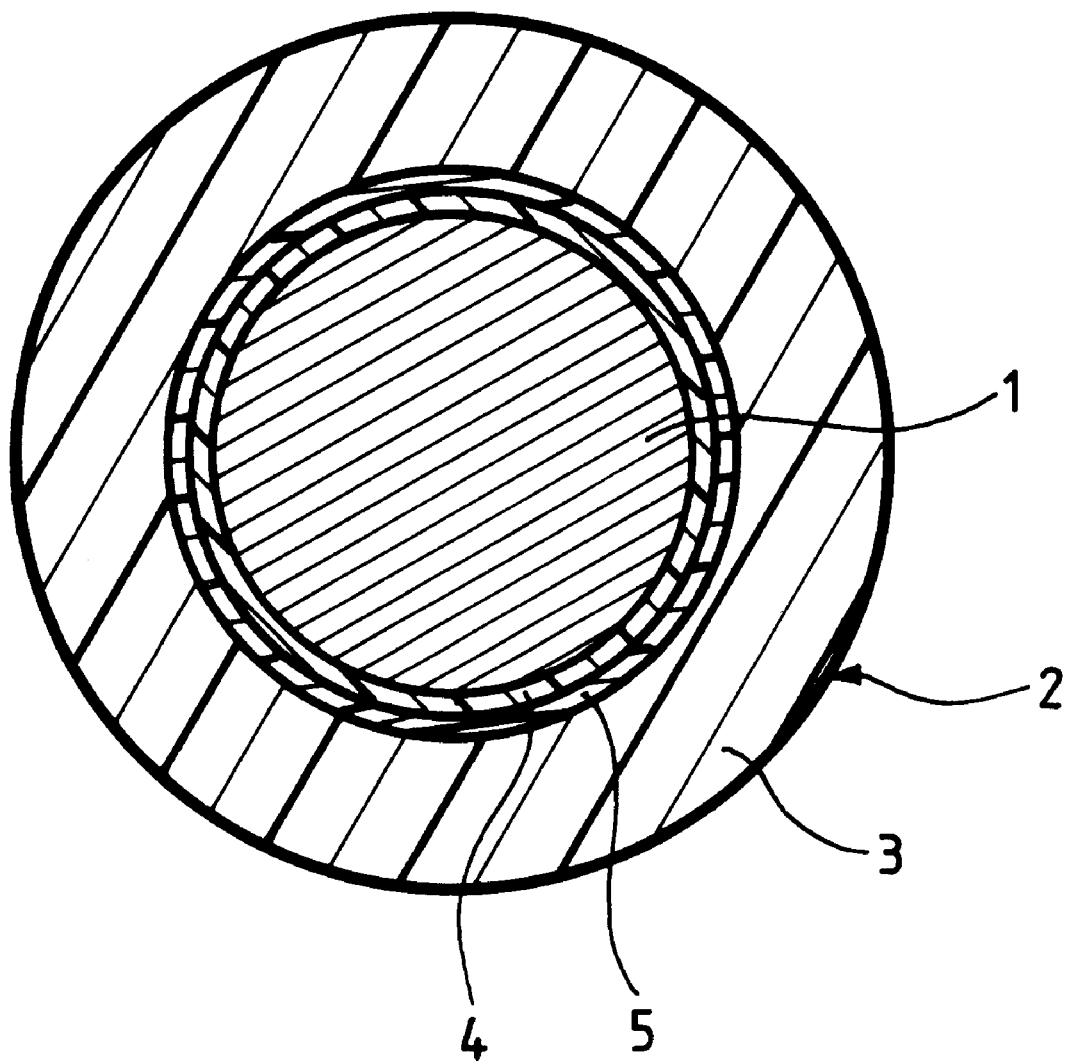

INSULATED ELECTRICAL WIRE WHICH WITHSTANDS TOTAL IMMERSION

The present invention relates to insulated electrical wires, in particular for windings, which can be used in complete safety when totally immersed in water or in oil and which withstand water and hydrolysis.

BACKGROUND OF THE INVENTION

Applications of such wires include submerged pumps, motors and pumps of domestic appliances such as washing machines, dishwashers and tumble dryers, automotive equipment, oil-filled transformers and wires in cables exposed to wet and/or oily environments.

Insulated electrical wires have a coating on their electrical conductor to provide electrical insulation of the electrical conductor and to enable the wire to withstand the environment. The coating is specific to the conditions of use of the wire.

Thus the coating of electrical wires which are totally immersed in water in use is formed of a relatively thick PVC layer extruded directly onto the electrical conductor. Because of the possibility of the PVC decomposing at higher temperatures, and the resulting pollution problems, PVC-coated wires have a relatively low thermal rating, less than 120° C.

Electrical wires for windings which are used in a wet environment but which are not immersed unless this happens accidentally are often coated with one or more layers of enamel to obtain a wire of small cross-section. However, in the equipment concerned, such wires are associated with circuits which protect against short-circuits in the event of accidental contact with water.

The conductor of an electrical wire which is totally immersed in oil when in use is generally coated with at least one layer of enamel and there is at least one layer of paper on top of the enamel, the combination enabling the enameled wire to withstand hydrolysis.

OBJECTS AND SUMMARY OF THE INVENTION

An object of the present invention is to provide an insulated electrical wire which can be used in water or in oil, which uses a uniform type of coating used in comparable prior art wires which are totally immersed in such media in use, and which avoids the need for the protection circuits associated with the other prior art wires referred to above.

Another object of the invention is to provide an insulated electrical wire of the above kind whose final cross-section is small compared to that of comparable prior art wires which are totally immersed in use.

A further object of the present invention is to provide an insulated wire of the above kind with a high thermal rating.

According to the present invention the insulated wire capable of withstanding immersion in water and in oil comprises an electrical conductor and a coating on the conductor and said coating comprises an inner layer formed of at least one layer of enamel on said conductor and an outer layer of polyphenylene oxide on top of said inner layer.

The polyphenylene oxide outer layer is advantageously of polyphenylene oxide modified by a polystyrene.

Said outer layer of polyphenylene oxide, whether modified or not, is advantageously from 50 μm to 250 μm thick.

Said inner layer preferably includes two enamel layers.

Said outer layer of polyphenylene oxide, whether modified or not, is advantageously extruded onto said inner layer.

BRIEF DESCRIPTION OF THE DRAWING

The features and advantages of the present invention emerge from the following description of an embodiment of the invention which is given by way of preferred but non-limiting example and with reference to the accompanying drawing.

MORE DETAILED DESCRIPTION

This embodiment of an insulated electrical wire includes an electrical conductor 1 and a coating 2 thereon. The coating 2 includes an outer layer 3 of polyphenylene oxide (PPO) or preferably of polyphenylene oxide modified with polystyrene (PPO/PS). The PPO or PPO/PS layer 3 can be relatively thick. However, it is advantageously thin, with a thickness lying in the range 50 μm to 250 μm and preferably in the range 50 μm to 150 μm.

In this embodiment the coating 2 also has an inner layer formed by two enamel sublayers 4 and 5 which are formed directly on the conductor 1 and over which the PPO or PPO/PS outer layer 3 is extruded. The innermost enamel sublayer 4 is of polyester-imide PEI and the other enamel sublayer 5 is of polyamide-imide PAI.

Of course, the coating could have only one enamel sublayer rather than the two sublayers referred to above.

The enamel layer or one of the enamel layers can instead be of polyester, polyurethane, polyvinyl formal, polyimide, or polyamide. The enamel sublayer(s) increase only slightly the radial thickness of the coating 2 and is/are preferably chosen to enhance the thermal rating of the wire.

The wire of the invention, in which the coating consists of an PPO or PPO/PS layer with at least one enamel sublayer, withstands water and hydrolysis particularly well and can be totally immersed in water or oil while in use or can be used in a wet environment without any associated short-circuit protection. A PPO or PPO/PS thickness in the range 50 μm to 250 μm can be sufficient, compared to a minimum PVC thickness of 700 μm required for PVC-coated wires having the same conductor cross-section and which are totally immersed in water in use. The cross-section of the finished wire is therefore small compared to PVC-coated wires. The cross-section of the finished wire is also small compared to paper-insulated enameled wires for use in transformers. For a given cross-section of the conductor, the invention provides a finished insulated wire of very small overall size, by virtue of which the electrical equipment using it achieves efficiency that is very much greater than that previously obtained.

The service life of the wire of the invention and the wire-to-wire insulation resistance in a winding when the wire is totally immersed in water in use are excellent and better than those of PVC-coated wire. Also, the adhesion of PPO or PPO/PS to an enameled conductor is better than that of PVC to a bare conductor.

Also, the wire of the invention has a higher thermal rating than PVC-coated wire and avoids any risk of pollution. The coating consisting of two sublayers of enamel, in particular of PEI and PAI, and a layer of PPO or PPO/PS enables the wire to be used while totally immersed in cold or hot water for windings of motors of class B (120° C.) or F (155° C.), which has not been possible with PVC-coated wire.

Tests conducted by the applicant on a wire having an outside diameter of 0.895 mm with a 0.56 mm diameter copper conductor and a coating consisting of two PEI and PAI enamel sublayers and a 150 µm thick PPO/PS layer showed the exceptional characteristics of such wire. In particular, the service life of the wire immersed in water at 60° C. and connected to an AC voltage of 600 V was better than 160 days (the enamel sublayers are known to make no contribution to improving the service life of totally immersed wires). The insulation resistance of the same wire measured during the service life test but with the wire connected to a DC voltage of 1000 V for 30 s was initially 770 Gohm and was still 64 Mohm at the end of the service life test.

The wire also had excellent physical properties for fabricating the winding.

The characteristics of the wire were compared to those of wires having a semi-aromatic polyamide or fluorinated polymer layer instead of and having the same thickness as the PPO/PS layer. The service life and the insulation resistance of such wires when totally immersed in water were very much inferior than those of the wire of the invention.

What is claimed is:

1. An insulated wire able to withstand immersion in water and in oil, the wire comprising an electrical conductor and a coating on said conductor, wherein said coating comprises an inner layer formed of at least one layer of enamel which is directly in contact with said conductor and an outer layer of polyphenylene oxide on top of said inner layer.

2. A wire according to claim 1, wherein said polyphenylene oxide outer layer is of polyphenylene oxide modified by polystyrene.

3. A wire according to claim 1, wherein the thickness of said outer layer lies in the range 50 µm to 250 µm.

4. A wire according to claim 3, wherein said outer layer is extruded.

5. A wire according to claim 1, wherein said at least one layer of enamel comprises two enamel layers located between said electrical conductor and said outer layer.

6. A wire according to claim 5, wherein the enamel layer is a layer of polyester-imide and the other layer is a layer of polyamide-imide.

7. A wire according to claim 1, the wire being used to fabricate a winding that can be immersed in water and in oil in use.

8. Magnet wire able to withstand immersion in water and oil, the wire comprising an electrical conductor and a coating on said conductor, wherein said coating comprises an inner layer formed of at least one layer of enamel which is directly in contact with said conductor and an outer layer of polyphenylene oxide on top of said inner layer.

* * * * *